United States Patent [19]

Belcastro, deceased et al.

[11] 4,158,335
[45] Jun. 19, 1979

[54] APPARATUS TO JOIN TABLE TOPS TOGETHER

[75] Inventors: Rosario Belcastro, deceased, late of Ambridge, Pa., by Patricia Belcastro, administratrix, 1816 3rd Ave., New Brighton, Pa. 15066

[73] Assignee: Patricia Belcastro, Beaver Falls, Pa.

[21] Appl. No.: 795,291

[22] Filed: May 9, 1977

[51] Int. Cl.² .................. A47B 57/00; F16B 7/00
[52] U.S. Cl. ......................... 108/64; 108/90; 403/292
[58] Field of Search ............ 403/297, 292; 46/26, 46/28, 27, 29; 108/64, 90, 65, 59; 16/30, 43; 52/585, 79.9

[56] References Cited

U.S. PATENT DOCUMENTS

| | | | |
|---|---|---|---|
| 799,176 | 9/1905 | Marble et al. | 403/292 |
| 2,679,911 | 6/1954 | Bhend | 403/292 X |
| 3,129,472 | 4/1964 | Hensel | 52/585 X |
| 3,210,795 | 10/1965 | Fontana | 16/43 |
| 3,313,199 | 4/1967 | Houvener et al. | 52/585 X |
| 3,314,206 | 4/1967 | Dau | 52/585 X |
| 3,452,452 | 7/1969 | Dore | 46/26 |
| 3,512,324 | 5/1970 | Reed | 52/585 X |
| 3,513,786 | 5/1970 | Kellogg | 52/585 X |
| 3,648,404 | 3/1972 | Ogsbury | 46/29 |
| 3,826,206 | 7/1974 | Ruggles | 108/64 |

FOREIGN PATENT DOCUMENTS 1243843 7/1967 Fed. Rep. of Germany ............ 108/65

Primary Examiner—James T. McCall
Attorney, Agent, or Firm—Thomas H. Murray; Clifford A. Poff

[57] ABSTRACT

Pedestal-type tables are joined together along two planar edges by using two pairs of alignable spaced-apart openings in the table tops. A sleeve member includes a resilient circumferential constriction closely spaced from the terminal of the sleeve wherein a fastener is used to secure the sleeve within the opening in the table top. Cylindrical connector elements each includes circumferential recesses spaced from the terminal ends to releasably receive the resilient constrictions in the sleeve member to form releasable interconnection elements in the aligned openings in the table tops when the planar edges are disposed in a juxtaposed relation.

5 Claims, 4 Drawing Figures

APPARATUS TO JOIN TABLE TOPS TOGETHER

BACKGROUND OF THE INVENTION

This invention relates to apparatus to releasably join together tables at planar edges of the table tops when disposed in a juxtaposed relation, and more particularly to apparatus employed to facilitate the use of two or more pedestal-like tables in an interconnected relation as a single table unit of the type used in restaurants and the like.

The tables used in many commercial eating establishments are pedestal-type tables which include a single support column extending between the table top and a base supported on the floor. The seating capacity of such a table usually never exceeds four and sometimes the tables are dimensioned to accommodate two persons. When it is necessary to accommodate a group of people whose number exceeds the capacity of a given table, it is the usual practive to arrange two or more tables which are rectangular and sometimes square in an abutting relation such that a side edge of the table tops contacts one another. A smooth table surface is not usually achieved when the tables are arranged in this manner because of wear and tear on the tables and irregularities in the floor surface.

SUMMARY OF THE INVENTION

It is an object of the present invention to provide an apparatus for removably joining together two or more table tops to maintain the planar edges thereof in a juxtaposed relation so that the top surfaces of the tables define a smooth continuous surface.

It is a further object of the present invention to provide apparatus for removably joining together two or more table tops in an efficient and economical manner by minimizing the number of parts required while maintaining an aesthetic appearance of the tables.

It is still another object of the present invention to provide apparatus for removably joining together a plurality of tables to provide a desired table configuration including elongated L-shaped, U-shaped and T-shaped arrangements of tables while releasably joined together in an interconnected relationship.

According to the present invention there is provided apparatus to removably join together two tables comprising the combination of first and second tables each including a support secured to a top which includes at least one planar edge, the planar edges of the two tops having equally-spaced and alignable openings, a sleeve member supported in each of the openings by the table tops, the internal projected portion of each sleeve member including a resilient circumferential constriction spaced from the terminal end of the sleeve member to lie within the table top, and two elongated connector elements each including circumferential recesses spaced from the terminal ends thereof to releasably receive the resilient circumferential constrictions in the sleeve members while supported in aligned openings in the two table tops, the circumferential recesses in each connector element being spaced by a distance corresponding to the space between the circumferential constrictions of two sleeve members while supported in aligned openings in table tops when the planar edges thereof are disposed in a juxtaposed relation.

In the preferred form of the present invention, the aformentioned sleeve member is tubular and the connector elements are cylindrical. One end of the sleeve member includes a collar received within a recess in the side edge of the table top to form a flush relation therewith. The connector elements include spherical ends between the circumferential recesses and the terminal ends thereof. Each sleeve member includes a spherical end wall between the circumferential constriction and the terminal end located within the table top. An opening in the terminal end of the sleeve member receives fastening means to secure the sleeve to the table top.

These features and advantages of the present invention as well as others will be more fully understood when the following description is read in light of the accompanying drawings, wherein.

Figure 1:
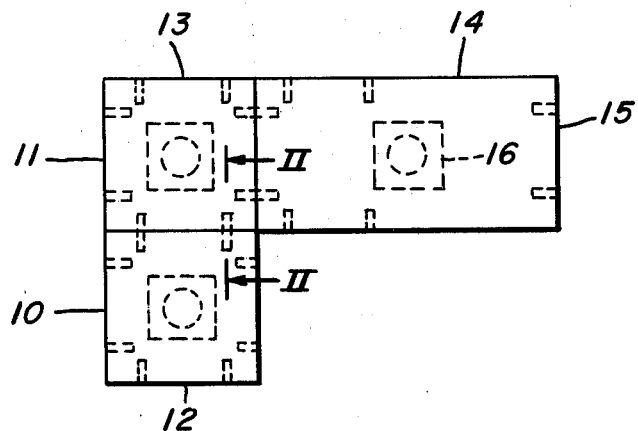
FIG. 1 is a plan view of a typical table unit made up of a plurality of tables interconnected by the apparatus of the present invention.
Figure 2:
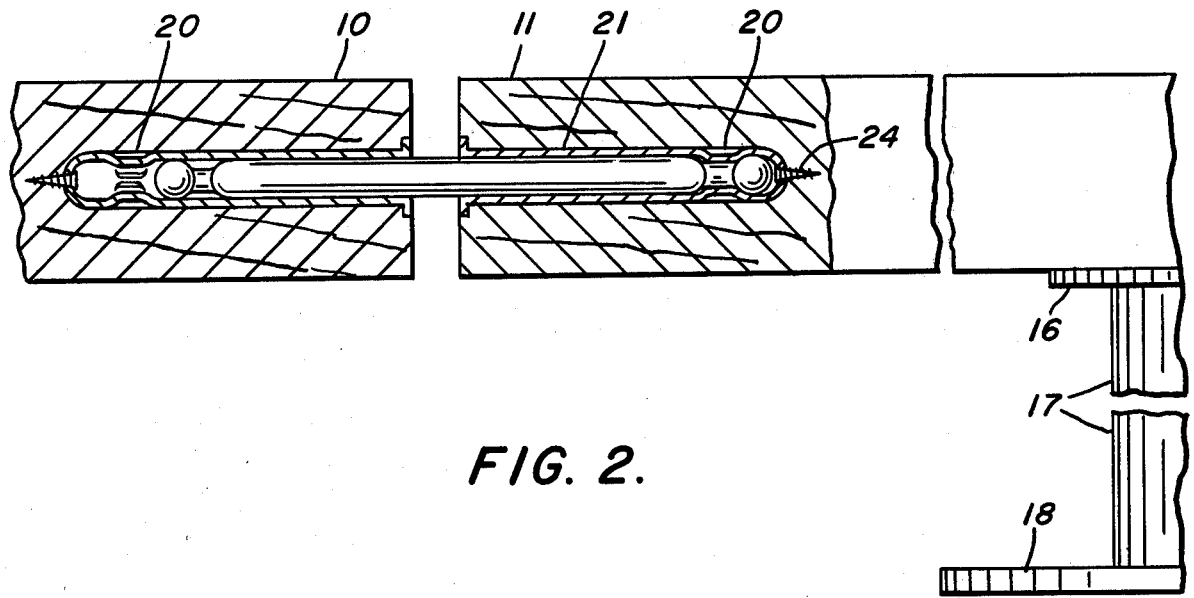
FIG. 2 is a sectional view taken along line II—II of FIG. 1.
Figure 3:
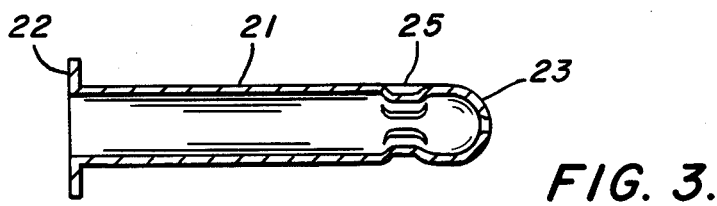
FIG. 3 is a transverse sectional view through a sleeve member of the present invention.
Figure 4:
FIG. 4 is a view of a connector element forming part of the apparatus of the present invention.

In FIG. 1, there is illustrated an L-shaped table assembly brought about by the employment of the apparatus embodying the present invention. The table assembly consists of two table assemblies 10 and 11 having square tops 12 and 13 and a table assembly 14 having a rectangular top 15. As illustrated in FIGS. 1 and 2, a mounting plate 16 is fastened to the bottom face of the table top and secured by welding or the like to a metal pedestal 17. A support plate 18 is secured to the bottom of the pedestal 17 and supports the table upon the floor. At least one planar edge of each table 10, 11 and 14, but preferably all four edges, includes two equally-spaced drilled openings 20. As readily apparent from FIG. 2, the drilled openings extend parallel to the table top and midway between the top and bottom surfaces thereof. The depth of the drilled openings 20 corresponds to the length of a tubular sleeve 21. As shown in FIGS. 2 and 3, the sleeve 21 includes a flange 22 at one end thereof which is received within a recess formed in the edge of the table top to form a flush relation and thereby maintain or even enhance the aesthetic appearance of the table. The end of the tubular sleeve 21 which is opposite the collar 22 includes a spherically-shaped end wall 23 into which a drilled opening is provided for receiving a threaded fastening device 24 passed into the table for retaining the sleeve member within the drilled opening 20. The spherical end wall 23 extends along the tubular member 21 to a circumferential constriction provided by internally-projecting ribs as may be typically formed by closed die punching operations. The internal length of the sleeve member 21 is slightly greater than ½ of the overall length of a cylindrical connector element 26. As shown in FIGS. 2 and 4, the connector element includes spherical ends 27 that extend to a circumferential recess 28 to receive the constriction 25 formed in a sleeve 21.

Rectangular, L-shaped, U-shaped or T-shaped configurations of table units are quickly and efficiently organized in eating establishments such as restaurants or the like by first providing that each table unit includes the sleeve members 21 in the manner described above. Connector elements 26 are then inserted into the sleeve members 21 supported by the table tops whereby the spherical ends 27 produce an elastic deformation of the constriction 25 and pass into the spherical end of the sleeve where it is retained by the constriction. The connector elements projecting from the table top into which they have been inserted are then fed into the sleeve members 21 in a second table top by moving one of the tables toward the other. As can be seen from FIG. 2, table 10 has been moved toward table 11 to the point where the spherical ends on connector elements 26 are about to elastically deform the constrictions 25 in the sleeve members 21. Continued movement of table 10 towards the table 11 causes the spherical end 27 to pass into the spherical ends in the sleeve member whereupon the planar edges of the table tops are disposed in a juxtaposed relation and releasably retained in this relationship. Throughout the use of the tables in their interconnected relation, the top surfaces are maintained in a smooth continuous alignment. Moreover, since the side edges of the tables are interconnected, one table, in effect, supports the other whereby a downward vertical force along the interconnected edges of the tables is resisted without a separation or tilting of one table relative to the other.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus to removably join together two tables comprising the combination of first and second tables each including a support secured to a top having at least one planar edge, the planar edges of the two tops having equally-spaced and alignable bored openings, a sleeve member supported in each of said openings by the table tops, the internal projected portion of each sleeve member including a resilient circumferential constriction spaced from the terminal end of the sleeve member to lie within the table top, two elongated connector elements each including two circumferential recesses spaced from the terminal ends thereof to releasably receive said resilient circumferential constrictions in the sleeve members while supported in aligned openings in the two table tops, the circumferential recesses in each connector element being spaced by a distance corresponding to the space between the circumferential constriction of two sleeve members while supported in aligned openings in the table tops when the planar edges thereof are disposed in a juxtaposed relation, and fastening means to secure each sleeve to a table top.

2. The apparatus according to claim 1 wherein said sleeve member is tubular and said connector elements are cylindrical.

3. The apparatus according to claim 2 wherein one end of said sleeve member includes a collar and said planar edges of the two table tops include recesses to receive the collar of each sleeve member.

4. The apparatus according to claim 2 wherein said connector elements include spherical ends between the circumferential recesses and the terminal ends.

5. The apparatus according to claim 4 wherein each sleeve member includes a spherical end wall between the circumferential constriction and the terminal end within the table top.

* * * * *